US011281600B2

(12) United States Patent
Subbiah et al.

(10) Patent No.: US 11,281,600 B2
(45) Date of Patent: Mar. 22, 2022

(54) ALUA/AGGREGATED SWITCH LATENCY REDUCTION SYSTEM

(71) Applicant: Dell Products L.P., Round Rock, TX (US)

(72) Inventors: Ramesh Kumar Subbiah, Tamil Nadu (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 125 days.

(21) Appl. No.: 16/439,515

(22) Filed: Jun. 12, 2019

(65) Prior Publication Data

US 2020/0394143 A1 Dec. 17, 2020

(51) Int. Cl.
| | |
|---|---|
| *G06F 13/16* | (2006.01) |
| *G06F 11/20* | (2006.01) |
| *H04L 12/723* | (2013.01) |
| *H04L 45/50* | (2022.01) |

(52) U.S. Cl.
CPC .......... *G06F 13/161* (2013.01); *G06F 11/201* (2013.01); *G06F 13/1668* (2013.01); *H04L 45/50* (2013.01)

(58) Field of Classification Search
None
See application file for complete search history.

(56) References Cited

U.S. PATENT DOCUMENTS

| | | | | |
|---|---|---|---|---|
| 2009/0310511 | A1* | 12/2009 | Vaswani | H04L 41/0816 370/254 |
| 2012/0182866 | A1* | 7/2012 | Vinayagam | H04L 45/245 370/228 |
| 2012/0303810 | A1* | 11/2012 | Kotha | H04L 12/413 709/225 |
| 2013/0343393 | A1* | 12/2013 | Sugihara | H04L 45/64 370/392 |
| 2017/0046086 | A1* | 2/2017 | Lam | H04L 67/1097 |

* cited by examiner

*Primary Examiner* — Farley Abad
*Assistant Examiner* — Dayton Lewis-Taylor
(74) *Attorney, Agent, or Firm* — Joseph Mencher

(57) ABSTRACT

An ALUA/aggregated switch latency reduction system includes a switch aggregation system coupling a server system including initiator devices to a storage system including target devices. The switch aggregation system includes a respective first switch device directly coupled to each of the target devices, and a respective second switch device directly coupled to each of the initiator devices. Each second switch device identifies an initiator device it is directly connected to, and transmits a respective first communication to each of the first switch devices that identifies that directly connected initiator device. When each second switch device receives a respective second communication from each of the first switch devices that identifies its directly connected target device, it identifies the first switch device directly connected to the target device that is in a session with its directly connected initiator device and, in response, causes packets to be forwarded to that first switch device.

20 Claims, 10 Drawing Sheets

ALUA/AGGREGATED SWITCH LATENCY REDUCTION SYSTEM

BACKGROUND

The present disclosure relates generally to information handling systems, and more particularly to reducing data transmission latency via information handling systems that are part of a switch aggregation in an Asymmetric Logical Unit Access (ALUA) deployment.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, storage systems, sometimes utilize storage subsystems that are associated with Logical Unit Numbers (LUNs) that identify a logical unit that is provided by the storage subsystem and addressed via the Small Computer System Interface (SCSI) protocol (or other Storage Area Network (SAN) protocols such as Fibre Channel, internet SCSI (iSCSI), etc., that encapsulates the SCSI protocol.) In some situations, such storage subsystems may be provided in Asymmetrical Logical Unit Access (ALUA) deployments in which each storage subsystem/LUN is accessible via a plurality of storage controllers/processors in the storage system, but with only one of the storage controllers/processors "owning" any particular storage subsystem/LUN. In such AULA deployments, optimized and un-optimized paths to any particular storage subsystem/LUN will exist, with the optimized path providing a direct path via a connection to the storage controller/processor that owns that storage subsystem/LUN, and the un-optimized path having a connection to the storage controller/processor that does not own that storage subsystem/LUN.

In some situations, packets may be sent along the un-optimized path, and must then be forwarded by the storage controller/processor in that un-optimized path to the storage controller/processor in the optimized path via a storage controller/processor interconnect. As such, the use of the un-optimized path in an ALUA deployment introduces latency associated with the need to forward packets between the storage controller/processors via the storage controller/processor interconnect. ALUA deployments attempt to address such latency issues by marking the optimized path to the storage controller/processor that owns the storage subsystem/LUN as active, with host systems (e.g., server systems) preferring the active optimized path in order to prevent the latency associated with the use of the un-optimized path.

However, the server systems discussed above are sometimes coupled to the storage systems discussed above by switch aggregations provided by a plurality of switch devices. For example, the Virtual Link Trunking (VLT) protocol is a proprietary aggregation protocol available in switch devices provided by Dell Inc. of Round Rock, Texas, United States, and operates to provide a redundant, load-balancing connection in a loop-free environment that eliminates the need to use the Spanning Tree Protocol (STP). The VLT protocol may be utilized in a plurality of switch devices provided between the server system and the storage system to provide a VLT switch aggregation that transmits packets between the server system and the storage system. However, in some situations, a VLT switch aggregation included in an ALUA deployment may introduce latency similar to that which the ALUA deployment is attempting to eliminate. For example, a first switch device that is provided as part of the VLT switch aggregation (e.g., a first VLT switch device) may be coupled to two second switch devices that are provided as part of the VLT switch aggregation (e.g., second VLT switch devices), with one of those second VLT switch devices directly connected to the storage controller/processor that owns the storage subsystem/LUN, and the other of those second VLT switch devices directly connected to the storage controller/processor that does not own the storage subsystem/LUN.

Upon receiving a packet from the server system, the first VLT switch device will perform hashing operations to determine which of the second VLT switch devices to forward that packet. As such, in some situations, the first VLT switch device may forward a packet to the second VLT switch device that is directly connected to the storage controller/processor that does not own the storage subsystem/LUN, which requires that second VLT switch device to forward that packet to the second VLT switch device that is directly connected to the storage controller/processor that owns the storage subsystem/LUN via a second VLT switch device interconnect, re-introducing the packet transmission latency that the ALUA deployment is attempting to eliminate. Furthermore, server systems that support ALUA and that have control over the ownership of storage subsystems/LUNs by the storage controller/processors will not be aware of this second VLT switch device interconnect packet forwarding, and thus have no means for addressing it.

Accordingly, it would be desirable to provide an ALUA/switch aggregation latency reduction system.

SUMMARY

According to one embodiment, an Information Handling System (IHS) includes a processing system; and a memory system that is coupled to the processing system and that includes instructions that, when executed by the processing system, cause the processing system to provide a switch engine that is configured to: identify an initiator device that is directly connected to the IHS; transmit, to each of a plurality of switch devices, a respective first communication that identifies the initiator device that is directly connected to the IHS; receive, from each of the plurality of switch devices, a respective second communication that identifies one of a plurality of target devices that is directly connected to that switch device; and identify one of the plurality of switch devices that is directly connected to the one of the plurality of target devices that is in a session with the initiator device that is directly connected to the IHS and, in response, cause first packets to be forwarded to that one of the plurality of switch devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
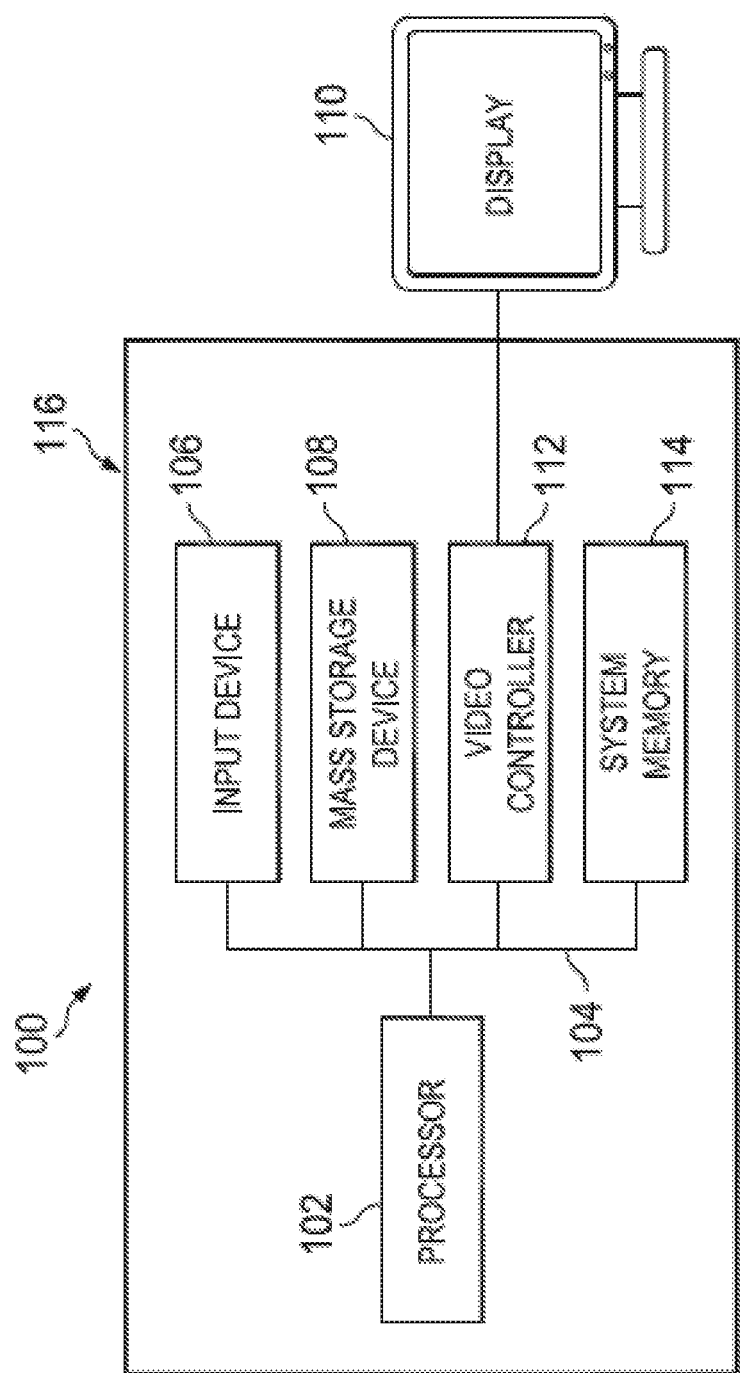
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
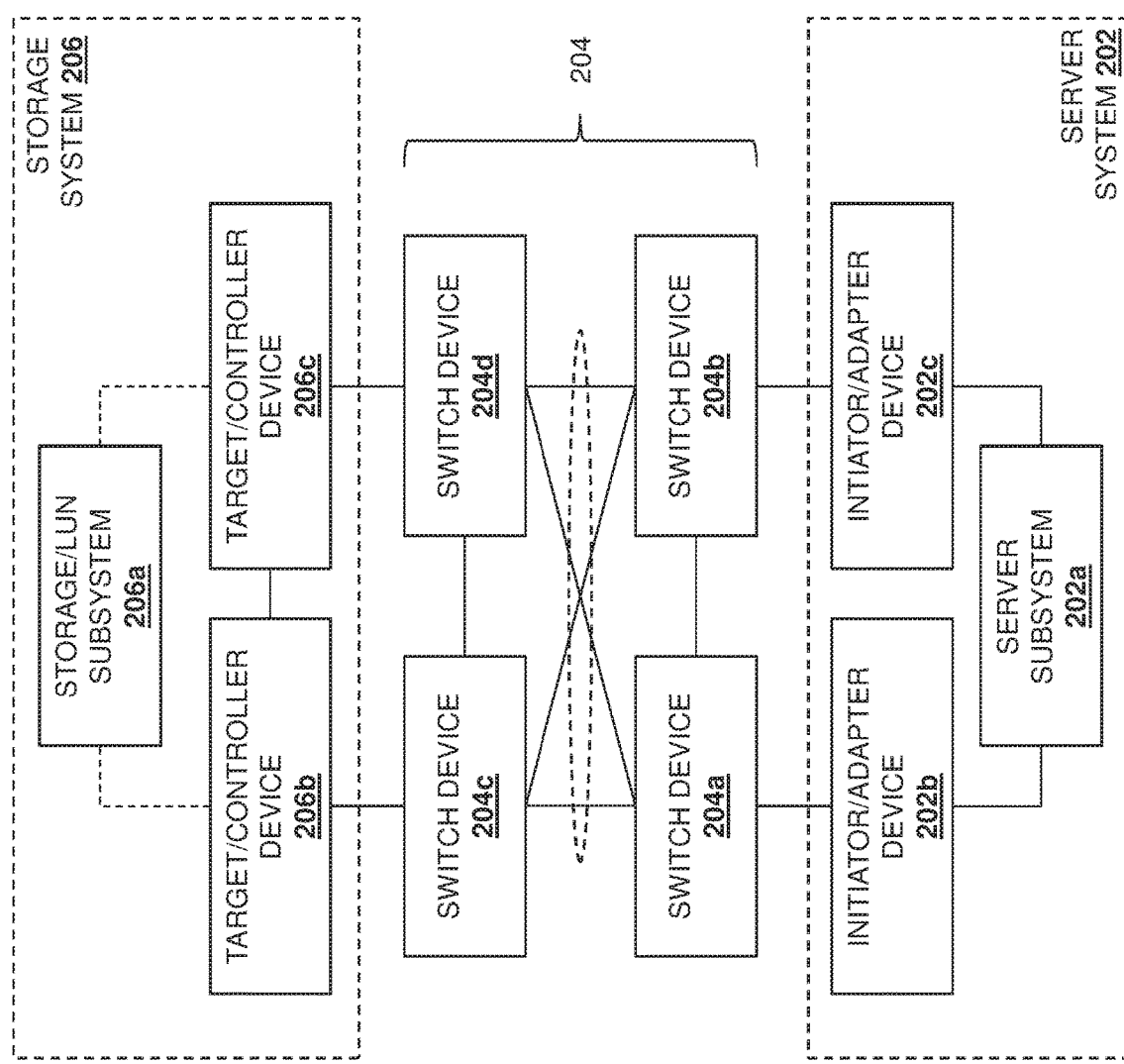
FIG. 2 is a schematic view illustrating an embodiment of an ALUA/aggregated switch latency reduction system.

Referring now to FIG. 2, an embodiment of an Asymmetric Logical Unit Access (ALUA)/aggregated switch latency reduction system 200 is illustrated. In the illustrated embodiment, the ALUA/aggregated switch latency reduction system 200 incudes a server system 202. In an embodiment, the server system 202 may be provided by the IHS 100 discussed above with reference to FIG. 1, and/or may include some or all of the components of the IHS 100. However, while illustrated and discussed as a server system 202 including one or more server devices, one of skill in the art in possession of the present disclosure will recognize that server system 202 provided in the ALUA/aggregated switch latency reduction system 200 may be provided by a variety of host systems that include any devices that may be configured to operate similarly as the server system/server devices discussed below. In the illustrated embodiment, the server system 202 includes a server subsystem 202a that may include any hardware and/or software (e.g., a server device, a processing system, an application, etc.) that is configured to generate and transmit packets, as well as perform any other the other server subsystem operations described below. Furthermore, in the illustrated embodiment, the server system 202 includes an initiator/adapter device 202b and an initiator/adapter device 202c, each of which is coupled to the server subsystem 202a. In a specific example, the initiator/adapter devices 202b and/or 202c may be provided by Converged Network Adapters (CNAs), although other initiator devices and/or adapter devices will fall within the scope of the present disclosure as well. While only two initiator/adapter devices are illustrated, one of skill in the art in possession of the present disclosure will recognize that the server system 202 may include more initiator/adapter devices while remaining within the scope of the present disclosure as well.

The ALUA/aggregated switch latency reduction system 200 also includes an aggregated switch system 204 that is coupled to the server system 202. In the illustrated embodiment, the aggregated switch system 204 includes a plurality of switch devices 204a, 204b, 204c, and 204d. Any or all of the switch devices 204a-d may be provided by the IHS 100 discussed above with reference to FIG. 1, and/or may include some or all of the components of the IHS 100. In a specific embodiment, the aggregated switch system is a Virtual Link Trunking (VLT) switch system provided via the VLT protocol, which is a proprietary aggregation protocol available in switch devices provided by DELL® Inc. of Round Rock, Tex., United States, and operates to provide a redundant, load-balancing connection in a loop-free environment that eliminates the need to use the Spanning Tree Protocol (STP). As such, each of the switch devices 204a-d may operate as VLT switch devices. However, other aggregated switch systems and switch devices will fall within the scope of the present disclosure as well.

In the illustrated embodiment, the switch device 204a in the aggregated switch system 204 is directly connected to the initiator/adapter device 202b in the server system 202, the switch device 204b in the aggregated switch system 204 is directly connected to the initiator/adapter device 202c in the server system 202, and the switch devices 204a and 204b are connected to each other via an Inter-Chassis Link (ICL) or ICL aggregation. In many embodiments, the initiator/adapter device 202b in the server system 202 may be coupled to an orphan port on the switch device 204a, and the initiator/adapter device 202c in the server system 202 may be coupled to an orphan port on the switch device 204b. As will be appreciated by one of skill in the art in possession of the present disclosure, orphan ports in a VLT switch system may be ports on the VLT switch devices that are not part of the VLT (e.g., non-VLT ports) and thus are not connected to a VLT port channel in the VLT switch device. Furthermore, in many embodiments including the illustrated embodiment, the initiator/adapter device 202b in the server system 202 will not include aggregated links to both of the switch devices 204a ad 204b, and the initiator/adapter device 202c in the server system 202 will not include aggregated links to both of the switch devices 204a ad 204b, with Multi-Path Input/Output (MPIO) techniques utilized by the initiator/adapter devices 202b and 202c in order to achieve path-level redundancy.

Furthermore, the switch device 202a includes links to each of the switch devices 202c and 202d, the switch device 202b includes links to each of the switch devices 202c and 202d, the switch device 202c includes links to each of the switch devices 202a and 202a, and the switch device 202d includes links to each of the switch devices 202a and 202b, with each of those links aggregated (e.g., in a VLT Link Aggregation Group (LAG)) as illustrated by the dashed circle in FIG. 2. Finally, the switch devices 204c and 204d are connected to each other via an Inter-Chassis Link (ICL) or ICL aggregation as well. However, while a specific aggregated switch system 204 has been illustrated (e.g., a "square VLT switch system" with four VLT switch devices), one of skill in the art in possession of the present disclosure will recognize that aggregated switch systems utilized in the ALUA/aggregated switch latency reduction system 200 may include a variety of different components (e.g., additional switch devices) and configurations while remaining within the scope of the present disclosure as well.

The ALUA/aggregated switch latency reduction system 200 also includes storage system 206 that is coupled to the aggregated switch system 204. In an embodiment, the storage system 206 may be provided by the IHS 100 discussed above with reference to FIG. 1, and/or may include some or all of the components of the IHS 100. However, while illustrated and discussed as a storage system 206 including one or more storage devices, one of skill in the art in possession of the present disclosure will recognize that storage system 206 provided in the ALUA/aggregated switch latency reduction system 200 may be provided by a variety of components that include any devices that may be configured to operate similarly as the storage system/storage devices discussed below. In the illustrated embodiment, the storage system 206 includes a storage/Logical Unit Number (LUN) subsystem 206a that may be associated with a logical unit provided by the storage subsystem and addressed via the Small Computer System Interface (SCSI) protocol (or other Storage Area Network (SAN) protocols such as Fibre Channel, internet SCSI (iSCSI), etc., that encapsulates the SCSI protocol.)

Furthermore, in the illustrated embodiment, the storage system 206 includes a target/controller device 206b and a target/controller device 206c that are coupled together by a target/controller interconnect, each of which is coupled to the storage/LUN subsystem 206a. As discussed below, during operation of the ALUA/aggregated switch latency reduction system 200, one of the target/controller device 206b and a target/controller device 206c will "own" the storage/LUN subsystem 206a, and thus the dashed lines between the storage/LUN subsystem 206a and each of the target/controller device 206b and a target/controller device 206c in FIG. 2 are provided to indicate connections that may enable such ownership, with a single solid line provided between the storage/LUN subsystem 206a and the target/controller device that owns it in the examples below in order to illustrate actual ownership. In a specific example, the target/controller devices 206b and/or 206c may be provided by storage controllers/processors, although other target devices and/or controller devices will fall within the scope of the present disclosure as well. While only two target/controller devices are illustrated, one of skill in the art in possession of the present disclosure will recognize that the storage system 202 may include more target/controller devices while remaining within the scope of the present disclosure as well. In the illustrated embodiment, the switch device 204c in the aggregated switch system 204 is directly connected to the target/controller device 206b in the storage system 206, and the switch device 204d in the aggregated switch system 204 is directly connected to the target/controller device 206c in the storage system 206.

In many embodiments, the target/controller device 206b in the storage system 206 may be coupled to an orphan port on the switch device 204c, and the target/controller device 206c in the storage system 206 may be coupled to an orphan port on the switch device 204d. As discussed above, orphan ports in a VLT switch system may be ports on the VLT switch devices that are not part of the VLT (e.g., non-VLT ports) and thus are not connected to a VLT port channel in the VLT switch device. Furthermore, in many embodiments including the illustrated embodiment, the target/controller device 206b in the storage system 206 will not include aggregated links to both of the switch devices 204c and 204d, and the target/controller device 206c in the storage system 206 will not include aggregated links to both of the switch devices 204c and 204d, with Multi-Path Input/Output (MPIO) techniques utilized by the target/controller device 206b and 206c in order to achieve path-level redundancy. While a specific ALUA/aggregated switch latency reduction system 200 has been illustrated and described, one of skill in the art in possession of the present disclosure will recognize that the ALUA/aggregated switch latency reduction system of the present disclosure may include a variety of components and component configurations while remaining within the scope of the present disclosure as well.

Figure 3:
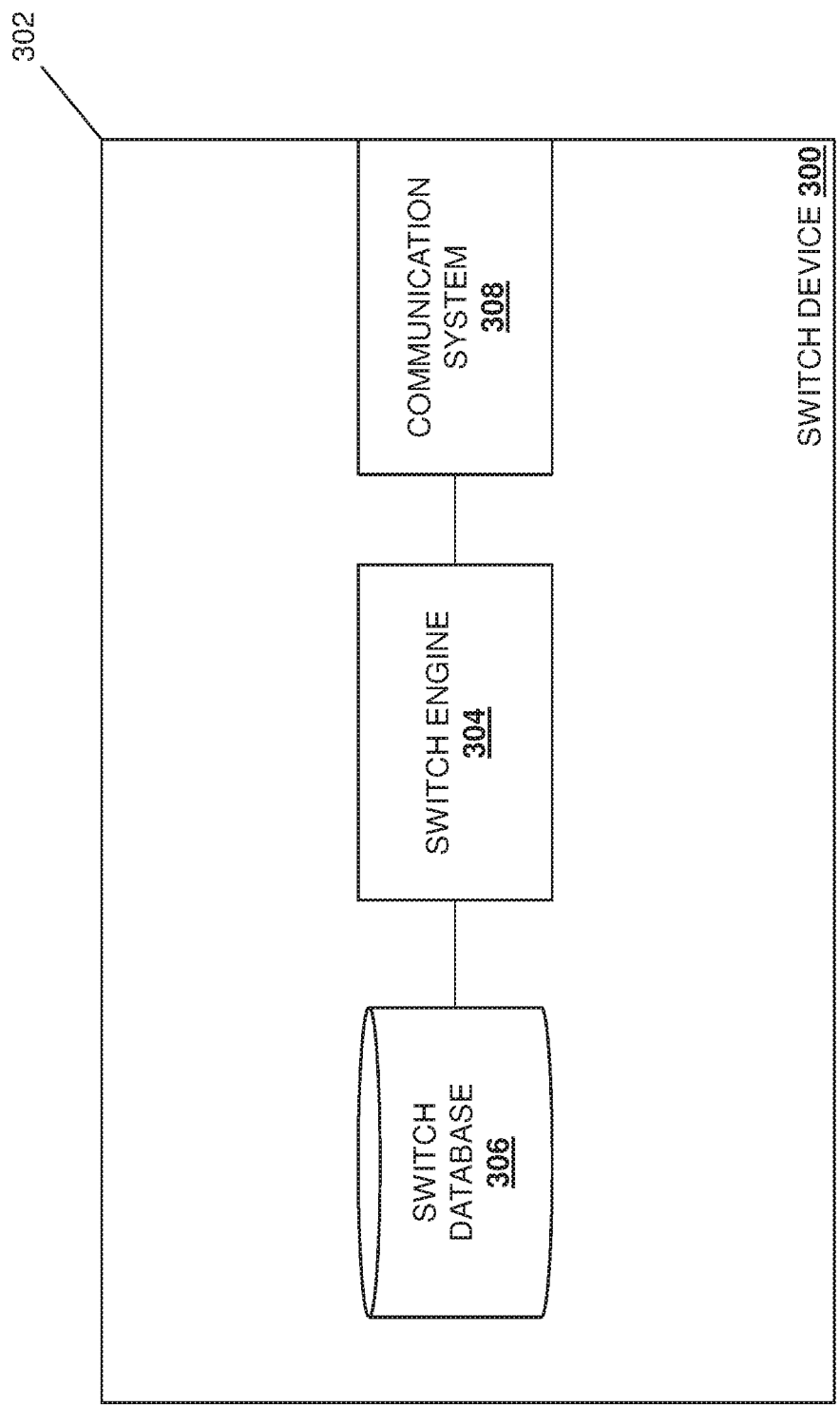
FIG. 3 is a schematic view illustrating an embodiment of a switch device that may be included in the ALUA/aggregated switch latency reduction system of FIG. 2.

Referring now to FIG. 3, an embodiment of a switch device 300 is illustrated that may provide any or all of the switch devices 204a, 204b, 204c, and/or 204d discussed above with reference to FIG. 2. As such, the switch device 300 may be provided by the IHS 100 discussed above with reference to FIG. 1 and/or may include some or all of the components of the IHS 100. Furthermore, while illustrated and discussed as a VLT switch device in some of the examples below, one of skill in the art in possession of the present disclosure will recognize that the functionality of the switch device 300 discussed below may be provided by other devices that are configured to operate similarly as discussed below. In the illustrated embodiment, the switch device 300 includes a chassis 302 that houses the components of the switch device 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a switch engine 304 that is configured to perform the functionality of the switch engines and/or switch devices discussed below.

The chassis 302 may also house a storage system (not illustrated, but which may include the storage 108 discussed above with reference to FIG. 1) that is coupled to the switch engine 304 (e.g., via a coupling between the storage system and the processing system) and that includes a switch database 306 that is configured to store any of the information utilized by the switch engine 304 discussed below. The chassis 302 may also house a communication system 308 that is coupled to the switch engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, etc.), and/or any other communication components that would be apparent to one of skill in the art in possession of the present disclosure. As such, the communication system 308 in the switch device 300 may include any of the ports utilized in the manners described below. While a specific switch device 300 has been illustrated, one of skill in the art in possession of the present disclosure will recognize that switch devices (or other devices operating according to the teachings of the present disclosure in a manner similar to that described below for the switch device 300) may include a variety of components and/or component configurations for providing conventional switch device functionality, as well as the functionality discussed below, while remaining within the scope of the present disclosure as well.

Figure 4:
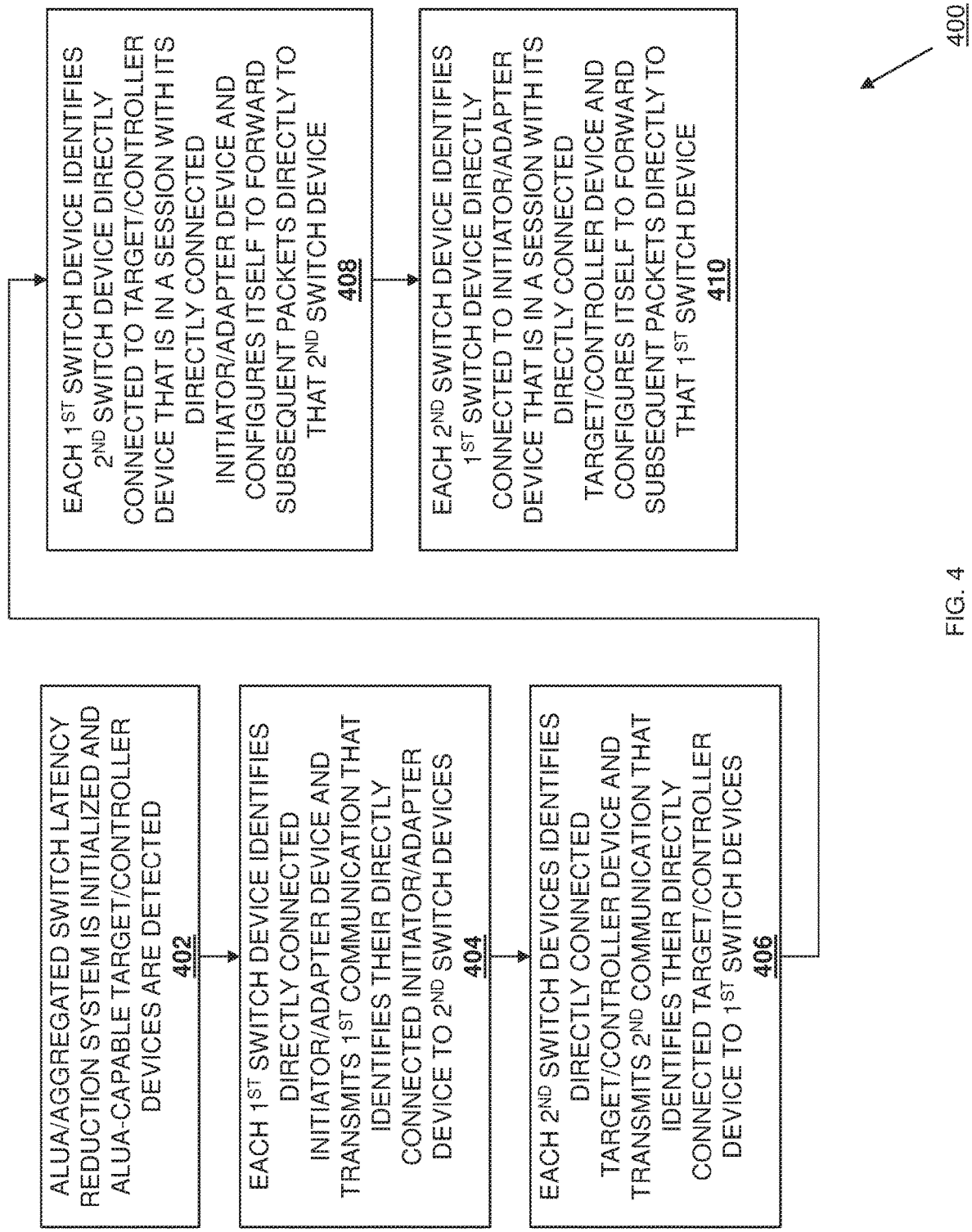
FIG. 4 is a flow chart illustrating an embodiment of a method for reducing latency in a switch aggregation that is part of an ALUA deployment.

Referring now to FIG. 4, an embodiment of a method 400 for reducing latency in a switch aggregation that is part of an ALUA deployment is illustrated. As discussed below, embodiments of the systems and methods of the present disclosure may provide for the identification and utilization of a shortest path available via aggregated switches between an initiator device and a target device that owns a storage subsystem. For example, in an ALUA deployment including an aggregated switch system that couples initiator devices to target devices, first switch devices in the aggregated switch system identify their directly connected initiator devices and second switch devices in the aggregated switch system identify their directly connected target devices. Each first switch device then transmits respective first communications to each of the second switch devices that identify their directly connected initiator device, and each second switch device transmits respective second communications to each of the first switch devices that identify their directly connected target device. Each first switch device may then identify one of the second switch devices that is directly connected to a target device that is in a session with its directly connected initiator device, and then cause subsequent packets to be forwarded to that second switch device. Similarly, each second switch device may identify one of the first switch devices that is directly connected to an initiator device that is in a session with its directly connected target device, then and cause subsequent packets to be forwarded to that first switch device. As such, when packets are received from an initiator device by a first switch device coupled to a second switch device that is directly connected to the target device that owns the storage subsystem, that first switch device will forward those packets to that second switch device rather than another second switch device that is directly connected to a target device that does not own the storage subsystem, which eliminates an additional hop for the packets between second switch devices (e.g., from one that is directly connected to the target device that does not own the storage subsystem to one that is directly connected to the target device that owns the storage subsystem.) As such, packet transmission latency in AULA/aggregated switch systems is reduced.

The method 400 begins at block 402 where an ALUA/aggregated switch latency reduction system is initialized and ALUA-capable target/controller devices are detected. In an embodiment, at block 402, the ALUA/aggregated switch latency reduction system 200 illustrated in FIG. 2 is initialized. As such, any or all of the server system 202, the aggregated switch system 204, and the storage system 206 may be powered on, reset, and/or otherwise initialized and, in response, may perform a variety of initialization operations that would be apparent to one of skill in the art in possession of the present disclosure. In particular, any of a variety of conventional ALUA configuration operations may be performed that result in one of a plurality of target/controller devices "owning" a storage/LUN subsystem, that result in the designation of Active-Optimized (AO) ports/path between an initiator/adapter device and the target/controller device that owns the storage/LUN subsystem, the results in the designation of Active-Non-Optimized (ANO) ports/path between an initiator/adapter device and a target/controller device that does not own the storage/LUN subsystem, and/or other ALUA configuration operations known in the art.

With reference to FIG. 2 and FIGS. 5A-5F below, and as discussed above, the illustrated embodiment of the ALUA/aggregated switch latency reduction system 200 provides an ALUA deployment in which the storage/LUN subsystem 206a is accessible via each of the target/controller devices 206b and 206c in the storage system 206, with the target/controller device 206b configured to "own" storage/LUN subsystem 206a in the examples below (as illustrated in FIGS. 5A-5F by the solid line between the target/controller device 206b and the storage/LUN subsystem 206a, and no line between the target/controller device 206c and the storage/LUN subsystem 206a). As will be appreciated by one of skill in the art in possession of the present disclosure, in the AULA deployment provided in the ALUA/aggregated switch latency reduction system 200 in the examples below, the AO path is provided the initiator device 202b, the switch device 204a, the switch device 204c, and the target controller device 206b, and the ANO path is provided by the initiator device 202c, the switch device 204b, the switch device 204d, and the target controller device 206c. In addition, ALUA configuration operations may result in the establishment of sessions between initiator/adapter devices and target/controller devices. For example, the ALUA configuration operations in the ALUA/aggregated switch latency reduction system 200 in the examples below establish a session between the initiator/adapter device 202b and the target/controller device 206b, and establish a session between the initiator/adapter device 202c and the target/controller device 206c.

As discussed above, absent the teachings of the present disclosure, an aggregated switch system similar to the aggregated witch system 204 (e.g., a conventional VLT switch system) may introduce latency that the ALUA deployment is attempting to eliminate. For example, with reference to the switch devices 204a-d in the aggregated switch system 204 in an example where those switch devices 204a-d are conventional VLT switch devices, upon receiving a packet from the initiator/adapter device 202b in the server system 202 (e.g., generated and transmitted by the server subsystem 202a), the VLT switch device 204a will perform hashing operations to determine which of the second VLT switch devices 204c and 204d to forward that packet. As such, in some situations, the VLT switch device 204a may forward that packet to the VLT switch device 204d (which is directly connected to the target/controller device 206c that does not own the storage/LUN subsystem 206a), which requires that VLT switch device 204d to forward that packet to the VLT switch device 204a (which is directly connected to the target/controller device 206b that owns the storage/LUN subsystem 206b) via the VLT switch device interconnect between them, re-introducing the packet transmission latency that the ALUA deployment is attempting to eliminate. As discussed above, the server system 202 has control over the ownership of storage/LUN subsystem 206a by the target/controller device 206b, but will not be aware of this VLT switch device interconnect packet forwarding between the VLT switch devices 204d and 204c, and thus has no means for addressing it. However, as discussed below, the teachings of the present disclosure prevent the VLT switch device 204 from forwarding packets to the switch device 204d, thus preventing the need for the VLT switch device interconnect packet forwarding between the VLT switch devices 204d and 204c, and reducing the associated packet transmission latency.

Figure 5A:
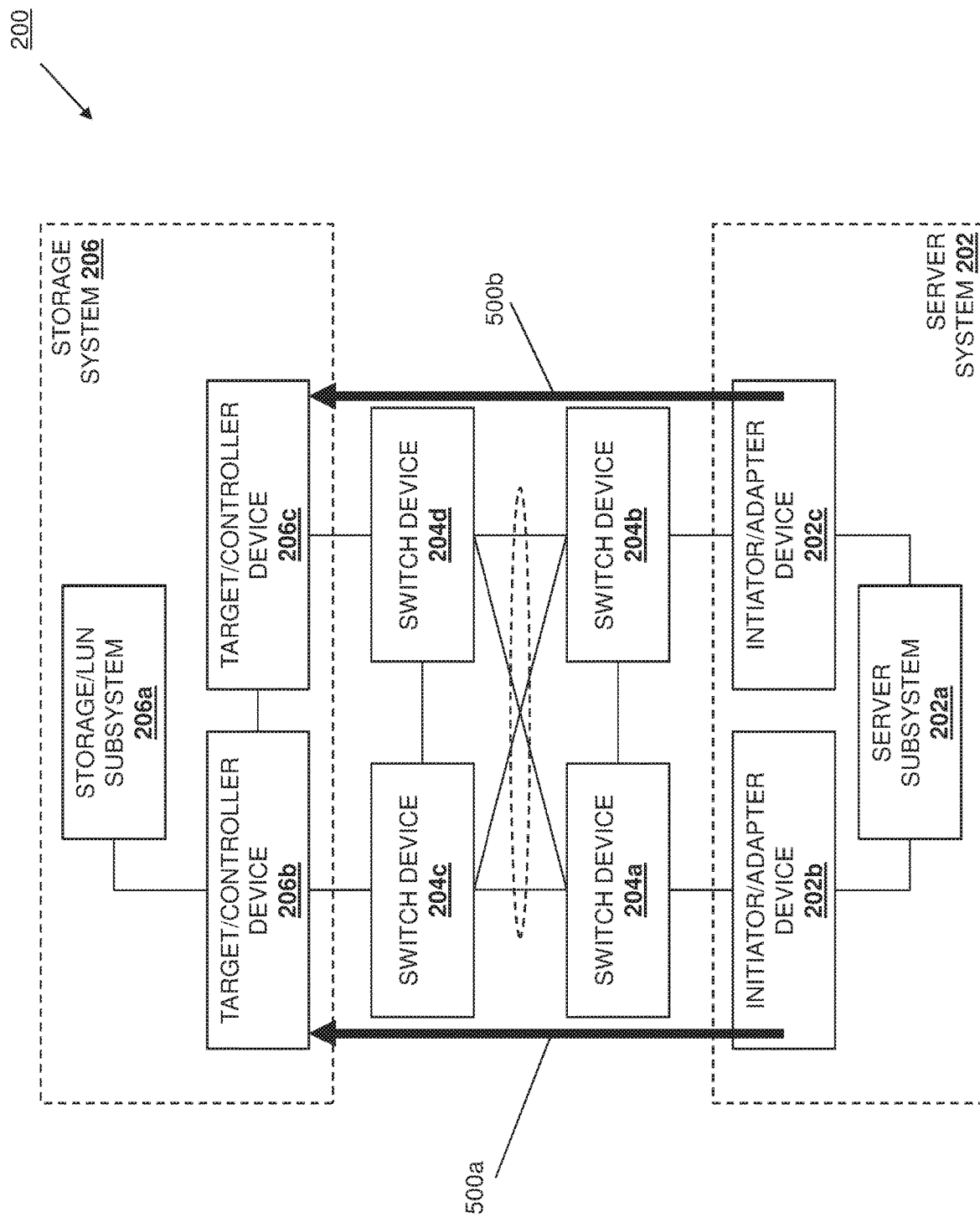
FIG. 5A is a schematic view illustrating an embodiment of the ALUA/aggregated switch latency reduction system operating during the method of FIG. 4.
Figure 5B:
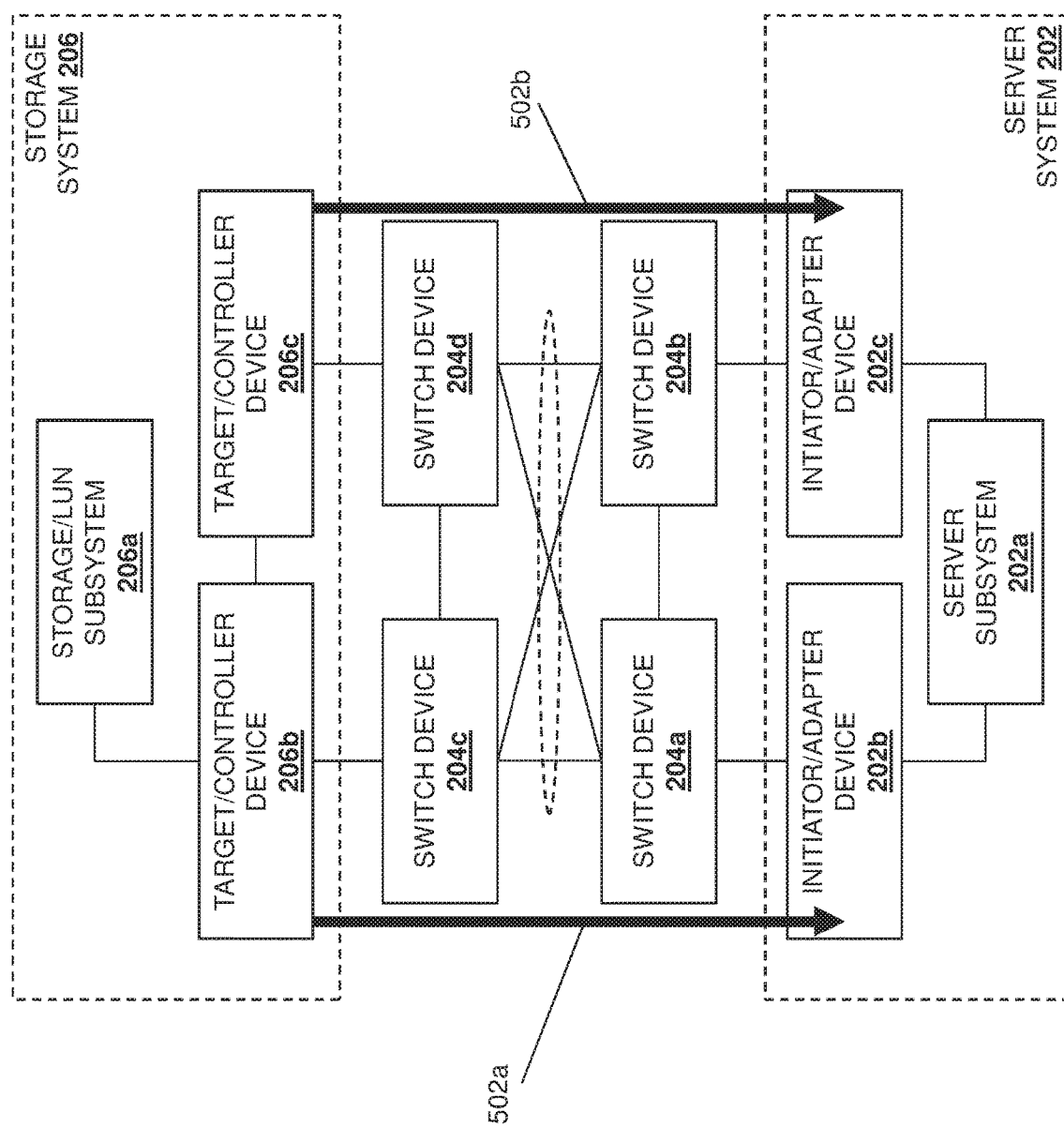
FIG. 5B is a schematic view illustrating an embodiment of the ALUA/aggregated switch latency reduction system operating during the method of FIG. 4.

With reference to FIG. 5A, in some embodiments at or following block 402, the initiator/adapter devices 202b and 202c may each operate to generate and transmit respective storage/LUN subsystem discovery communications 500a and 500b to the respective target/controller devices 206b and 206c. For example, the storage/LUN subsystem discovery communication 500a and 500b may include iSCSI INQUIRY messages and/or other storage subsystem discovery messages that would be apparent to one of skill in the art in possession of the present disclosure. With reference to FIG. 5B, in response to receiving the storage/LUN subsystem discovery communication 500a and 500b, the target/controller devices 206b and 206c may each operate to generate and transmit respective storage/LUN subsystem discovery responses 502a and 502b to the respective initiator/adapter devices 202b and 202c. For example, the storage/LUN subsystem discovery responses 502a and 502b may include iSCSI INQUIRY responses and/or other storage subsystem discovery responses that would be apparent to one of skill in the art in possession of the present disclosure.

Furthermore, the switch engine 304 in the switch devices 204a-d may operate to snoop the respective storage/LUN subsystem discovery responses 502a and 502b in order to identify an ALUA capability of the respective target/controller devices 206b and 206c. For example, the switch engine 304 in the switch devices 204a-d may operate to snoop a Target Port Group Support (TPGS) field the respective the iSCSI INQUIRY responses transmitted by the target/controller devices 206b and 206c in order to identify that each of the respective target/controller devices 206b and 206c includes ALUA capabilities. In response to determining that the target/controller devices 206b and 206c include ALUA capabilities and/or otherwise support ALUA, the method 400 may proceed. As will be appreciated by one of skill in the art in possession of the present disclosure, the method 400 illustrated in FIG. 4 assumes the ALUA capabilities/support by the target/controller devices 206b and 206c, but may be modified to end following block 402 if such ALUA capabilities/support by the target/controller devices 206b and 206c is not present.

The method 400 then proceeds to block 404 where each of a plurality of first switch devices identifies a directly connected initiator/adapter device and transmits a first communication that identifies their directly connected initiator/adapter device to each of a plurality of second switch devices. As discussed above, the ALUA configuration operations in the ALUA/aggregated switch latency reduction system 200 may have established a session between the initiator/adapter device 202b and the target/controller device 206b, as well as a session between the initiator/adapter device 202c and the target/controller device 206c. As such, during the method 400, the initiator/adapter device 202b and the target/controller device 206b may exchange session communications, and the initiator/adapter device 202c and the target/controller device 206c may exchange session communications. In an embodiment, at block 404, the switch engine 304 in each of the switch devices 204a and 204b (e.g., an iSCSI session monitoring feature enabled in the switch engine 304) may operate to snoop session communications that it transmits between and initiator/adapter device and a target/controller device in order to identify a variety of information included in those session communications including, for example, a initiator/adapter device Internet Protocol (IP) address, a target/controller device IP address, an initiator/adapter device Media Access Control (MAC) address, a target/controller device MAC address, a port number for a port on which that session communication was received, and/or any other session communication information that would be apparent to one of skill in the art in possession of the present disclosure.

At block 404, the switch engine 304 in each of the switch devices 204a and 204b may operate to provide the session communication information identified from the snooping of the session communications in a table. For example, with reference to the ALUA/aggregated switch latency reduction system 200 illustrated in FIG. 2, the switch device 204a may generate the following table A:

| SESSION IDENTIFIER | INITIATOR MAC ADD. | TARGET MAC ADD. | INITIATOR IP ADD. | TARGET IP ADD. | DEVICE LEARNT |
|---|---|---|---|---|---|
| session 1 | MAC address device 202b | MAC address device 206b | IP address device 202b | IP address device 206b | Initiator device 202b |

-continued

| SESSION IDENTIFIER | INITIATOR MAC ADD. | TARGET MAC ADD. | INITIATOR IP ADD. | TARGET IP ADD. | DEVICE LEARNT |
|---|---|---|---|---|---|
| session 2 | MAC address device 202c | MAC address device 206c | IP address device 202c | IP address device 206c | none |

Figure 5C:
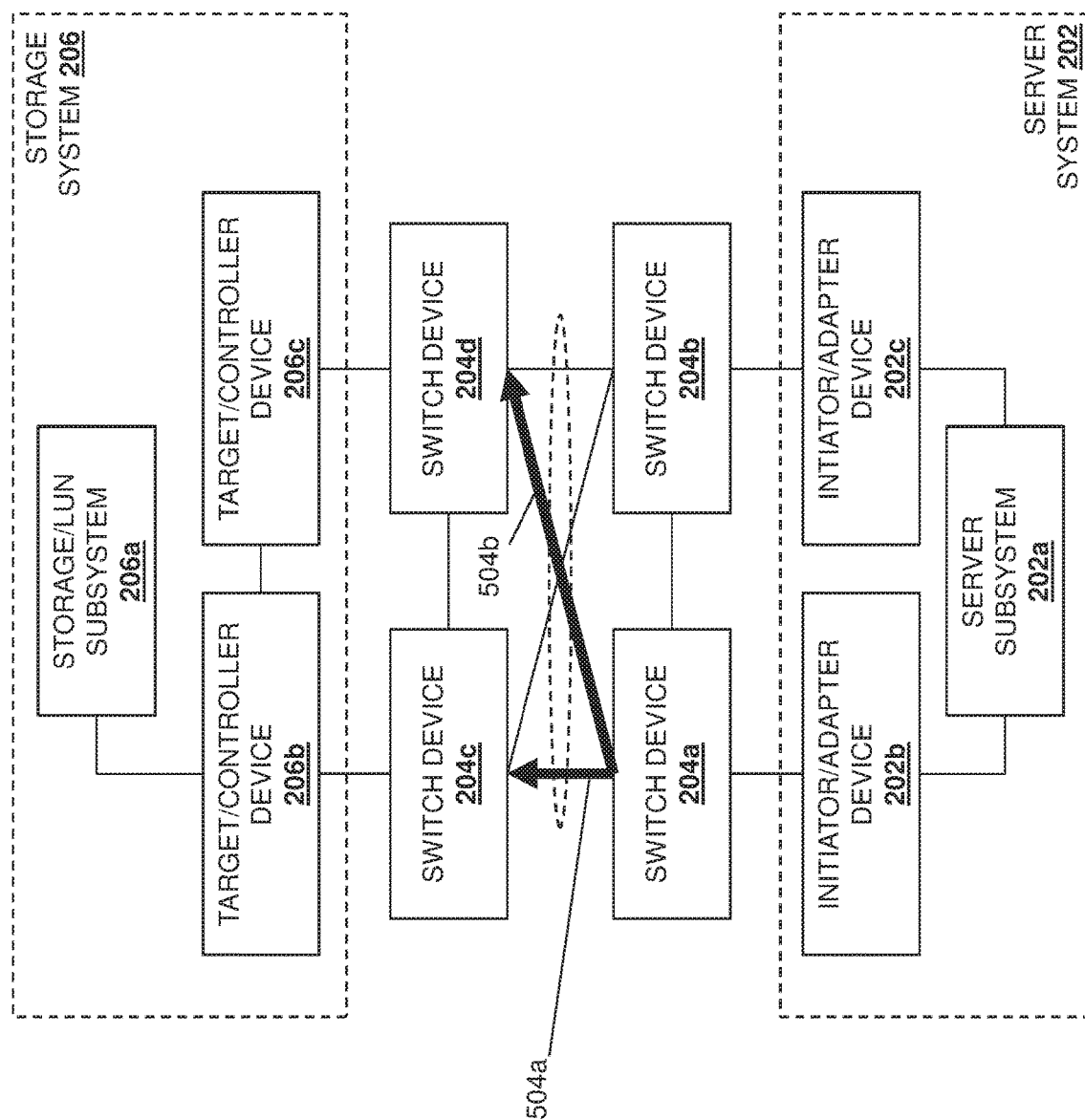
FIG. 5C is a schematic view illustrating an embodiment of the ALUA/aggregated switch latency reduction system operating during the method of FIG. 4.

As will be appreciated by one of skill in the art in possession of the present disclosure, the table A above illustrates how session communications between the initiator/adapter device 202b and the target/controller device 206b that are handled by the switch device 204a may be associated with a session identifier ("session 1"), a MAC address of the initiator/adapter device 202b, an MAC address of the target/controller device 206b, an IP address of the initiator/adapter device 202b, and an IP address of the target/controller device 206b. Furthermore, the switch engine 304 in the switch device 204a/300 may determine the MAC address of the initiator/adapter device 202b identified in the snooped session communications for "session 1" and, in response to that MAC address being associated with the initiator/adapter device 202b that is directly connected to its orphan port (discussed above), may "learn" the initiator/adapter device 202b (as indicated by the "initiator device 202b" indication in the "DEVICE LEARNT" column of the table for "session 1"). As such, at block 404, the switch engine 304 in the switch device 204a/300 identifies its directly connected initiator/adapter device 202b. As illustrated in FIG. 5C, at block 404, the switch engine 304 in the switch device 204a/300 may then generate and transmit communications 504a and 504b that identify its directly connected initiator/adapter device 202b to each of the switch devices 204c and 204d. For example, the communications 504a and 504b may be provided by Type-Length-Value (TLV) communications that include information (e.g., a MAC address) that identifies the initiator/adapter device 202b, as well as any other information that would be apparent to one of skill in the art in possession of the present disclosure.

Similarly, the table above illustrates how session communications between the initiator/adapter device 202c and the target/controller device 206c that are handled by the switch device 204a may be associated with a session identifier ("session 2"), a MAC address of the initiator/adapter device 202c, an MAC address of the target/controller device 206c, an IP address of the initiator/adapter device 202c, and an IP address of the target/controller device 206c. Furthermore, neither of the MAC addresses for the initiator/adapter device 202c and the target/controller device 206c identified in the snooped session communications for "session 2" is associated with a device that is directly connected to the switch device 204a, and thus the switch engine 304 in the switch device 204a/300 will not "learn" any devices for that session (as indicated by the "none" indication in the "DEVICE LEARNT" column of the table for "session 2").

Continuing with the example with reference to the ALUA/aggregated switch latency reduction system 200 illustrated in FIG. 2, the switch device 204b may generate the following table B:

| SESSION IDENTIFIER | INITIATOR MAC ADD. | TARGET MAC ADD. | INITIATOR IP ADD. | TARGET IP ADD. | DEVICE LEARNT |
|---|---|---|---|---|---|
| session 1 | MAC address device 202b | MAC address device 206b | IP address device 202b | IP address device 206b | none |
| session 2 | MAC address device 202c | MAC address device 206c | IP address device 202c | IP address device 206c | Initiator device 202c |

As will be appreciated by one of skill in the art in possession of the present disclosure, the table B above illustrates how session communications between the initiator/adapter device 202b and the target/controller device 206b that are handled by the switch device 204a may be associated with a session identifier ("session 1"), a MAC address of the initiator/adapter device 202b, an MAC address of the target/controller device 206b, an IP address of the initiator/adapter device 202b, and an IP address of the target/controller device 206b. Furthermore, neither of the MAC addresses for the initiator/adapter device 202b and the target/controller device 206b identified in the snooped session communications for "session 1" is associated with a device that is directly connected to the switch device 204b, and thus the switch engine 304 in the switch device 204b/300 will not "learn" any devices for that session (as indicated by the "none" indication in the "DEVICE LEARNT" column of the table for "session 1").

Figure 5D:
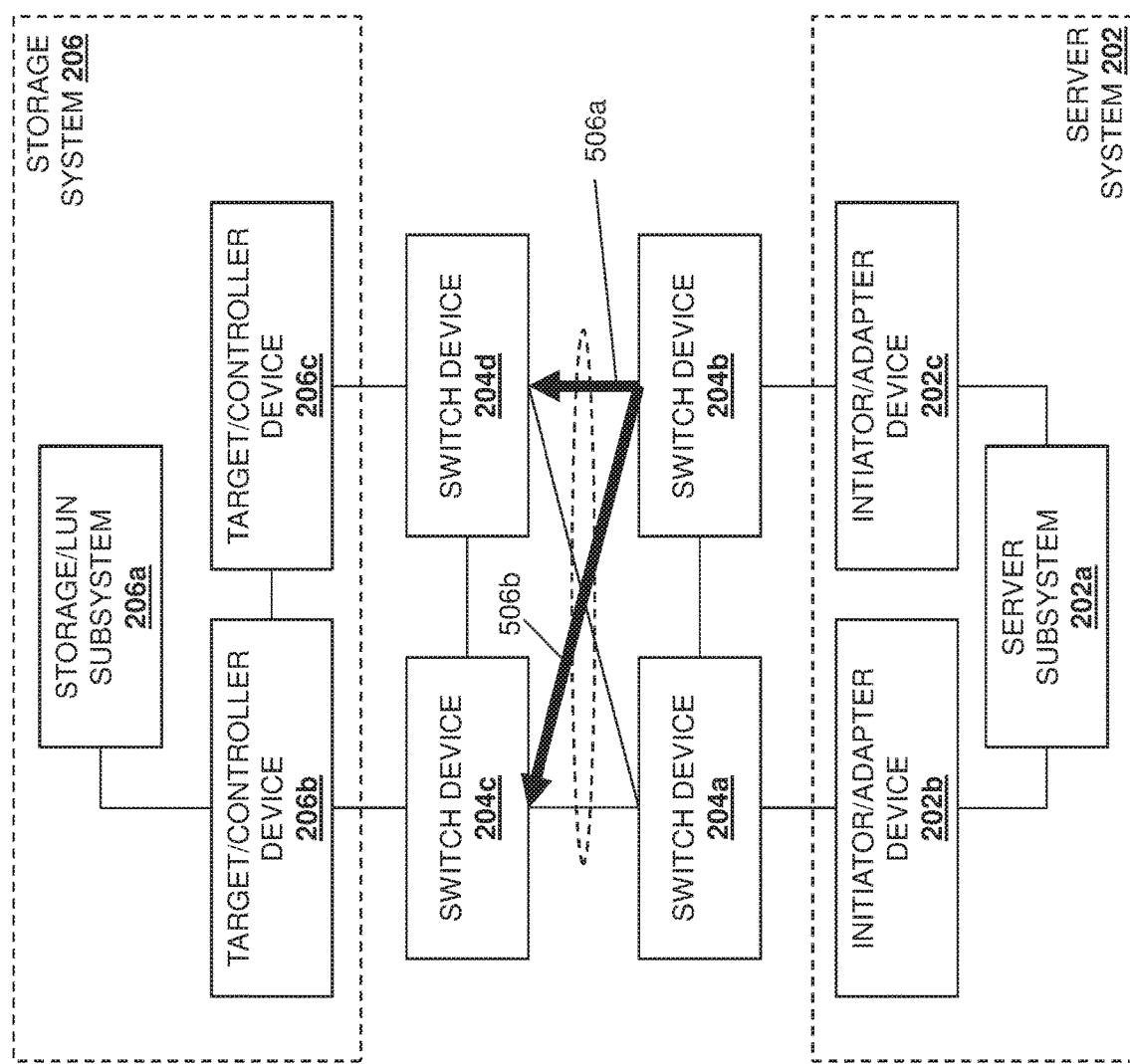
FIG. 5D is a schematic view illustrating an embodiment of the ALUA/aggregated switch latency reduction system operating during the method of FIG. 4.

Similarly, the table above illustrates how session communications between the initiator/adapter device 202c and the target/controller device 206c that are handled by the switch device 204a may be associated with a session identifier ("session 2"), a MAC address of the initiator/adapter device 202c, an MAC address of the target/controller device 206c, an IP address of the initiator/adapter device 202c, and an IP address of the target/controller device 206c. Furthermore, the switch engine 304 in the switch device 204b/300 may determine the MAC address of the initiator/adapter device 202c identified in the snooped session communications for "session 2" and, in response to that MAC address being associated with the initiator/adapter device 202c that is directly connected to its orphan port (discussed above), may "learn" the initiator/adapter device 202c (as indicated by the "initiator device 202c" indication in the "DEVICE LEARNT" column of the table for "session 2"). As such, at block 404, the switch engine 304 in the switch device 204b/300 identifies its directly connected initiator/adapter device 202c. As illustrated in FIG. 5D, at block 404, the switch engine 304 in the switch device 204b/300 may then generate and transmit communications 506a and 506b that identify its directly connected initiator/adapter device 202c to each of the switch devices 204c and 204d. For example, the communications 506a and 506b may be provided by Type-Length-Value (TLV) communications that include information (e.g., a MAC address) that identifies the initiator/adapter device 202c, as well as any other information that would be apparent to one of skill in the art in possession of the present disclosure.

The method 400 then proceeds to block 406 where each of the plurality of second switch devices identifies a directly connected target/controller device and transmits a second communication that identifies their directly connected target/controller device to each of the plurality of first switch devices. As discussed above, the ALUA configuration operations in the ALUA/aggregated switch latency reduction system 200 may have established a session between the initiator/adapter device 202b and the target/controller device 206b, as well as a session between the initiator/adapter device 202c and the target/controller device 206c. As such, during the method 400, the initiator/adapter device 202b and the target/controller device 206b may exchange session communications, and the initiator/adapter device 202c and the target/controller device 206c may exchange session communications. In an embodiment, a block 404, the switch engine 304 in each of the switch devices 204c and 204d (e.g., an iSCSI session monitoring feature enabled in the switch engine 304) may operate to snoop session communications that it transmits between and initiator/adapter device and a target/controller device in order to identify a variety of information included in those session communications including, for example, a initiator/adapter device Internet Protocol (IP) address, a target/controller device IP address, an initiator/adapter device Media Access Control (MAC) address, a target/controller device MAC address, a port number of the port on which the session communication was received, and/or any other session communication information that would be apparent to one of skill in the art in possession of the present disclosure.

Continuing with the example with reference to the ALUA/aggregated switch latency reduction system 200 illustrated in FIG. 2, the switch device 204c may generate the following table C:

| SESSION IDENTIFIER | INITIATOR MAC ADD. | TARGET MAC ADD. | INITIATOR IP ADD. | TARGET IP ADD. | DEVICE LEARNT |
|---|---|---|---|---|---|
| session 1 | MAC address device 202b | MAC address device 206b | IP address device 202b | IP address device 206b | target device 206b |
| session 2 | MAC address device 202c | MAC address device 206c | IP address device 202c | IP address device 206c | none |

Figure 5E:
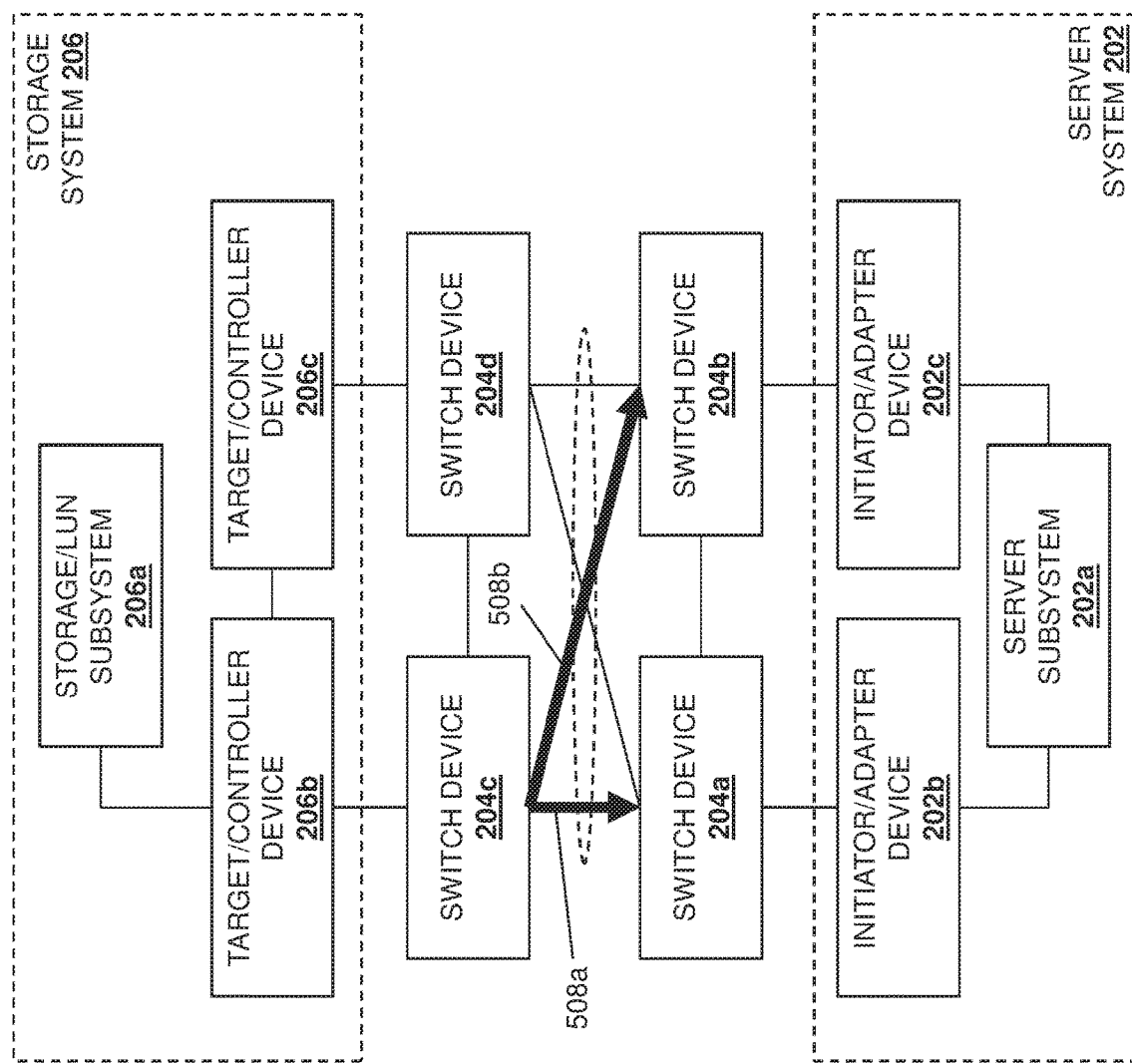
FIG. 5E is a schematic view illustrating an embodiment of the ALUA/aggregated switch latency reduction system operating during the method of FIG. 4.

As will be appreciated by one of skill in the art in possession of the present disclosure, the table C above illustrates how session communications between the initiator/adapter device 202b and the target/controller device 206b that are handled by the switch device 204c may be associated with a session identifier ("session 1"), a MAC address of the initiator/adapter device 202b, an MAC address of the target/controller device 206b, an IP address of the initiator/adapter device 202b, and an IP address of the target/controller device 206b. Furthermore, the switch engine 304 in the switch device 204b/300 may determine the MAC address of the target/controller device 206b identified in the snooped session communications for "session 1" and, in response to that MAC address being associated with the target/controller device 206b that is directly connected to its orphan port (discussed above), may "learn" the target/controller device 206b (as indicated by the "target device 206b" indication in the "DEVICE LEARNT" column of the table for "session 1"). As such, at block 404, the switch engine 304 in the switch device 204c/300 identifies its directly connected target/controller device 206b. As illustrated in FIG. 5E, at block 404, the switch engine 304 in the switch device 204c/300 may then generate and transmit communications 508a and 508b that identify its directly connected target/controller device 206b to each of the switch devices 204a and 204b. For example, the communications 508a and 508b may be provided by Type-Length-Value (TLV) communications that include information (e.g., a MAC address) that identifies the target/controller device 206b, as well as any other information that would be apparent to one of skill in the art in possession of the present disclosure.

Similarly, the table above illustrates how session communications between the initiator/adapter device 202c and the target/controller device 206c that are handled by the switch device 204c may be associated with a session identifier ("session 2"), a MAC address of the initiator/adapter device 202c, an MAC address of the target/controller device 206c, an IP address of the initiator/adapter device 202c, and an IP address of the target/controller device 206c. Furthermore, neither of the MAC addresses for the initiator/adapter device 202c and the target/controller device 206c identified in the snooped session communications for "session 2" is associated with a device that is directly connected to the switch device 204b, and thus the switch engine 304 in the switch device 204b/300 will not "learn" any devices for that session (as indicated by the "none" indication in the "DEVICE LEARNT" column of the table for "session 2").

Continuing with the example with reference to the ALUA/aggregated switch latency reduction system 200 illustrated in FIG. 2, the switch device 204d may generate the following table D:

| SESSION IDENTIFIER | INITIATOR MAC ADD. | TARGET MAC ADD. | INITIATOR IP ADD. | TARGET IP ADD. | DEVICE LEARNT |
|---|---|---|---|---|---|
| session 1 | MAC address device 202b | MAC address device 206b | IP address device 202b | IP address device 206b | none |
| session 2 | MAC address device 202c | MAC address device 206c | IP address device 202c | IP address device 206c | target device 206c |

As will be appreciated by one of skill in the art in possession of the present disclosure, the table D above illustrates how session communications between the initiator/adapter device 202*b* and the target/controller device 206*b* that are handled by the switch device 204*d* may be associated with a session identifier ("session 1"), a MAC address of the initiator/adapter device 202*b*, an MAC address of the target/controller device 206*b*, an IP address of the initiator/adapter device 202*b*, and an IP address of the target/controller device 206*b*. Furthermore, neither of the MAC addresses for the initiator/adapter device 202*b* and the target/controller device 206*b* identified in the snooped session communications for "session 1" is associated with a device that is directly connected to the switch device 204*d*, and thus the switch engine 304 in the switch device 204*d*/300 will not "learn" any devices for that session (as indicated by the "none" indication in the "DEVICE LEARNT" column of the table for "session 1").

Figure 5F:
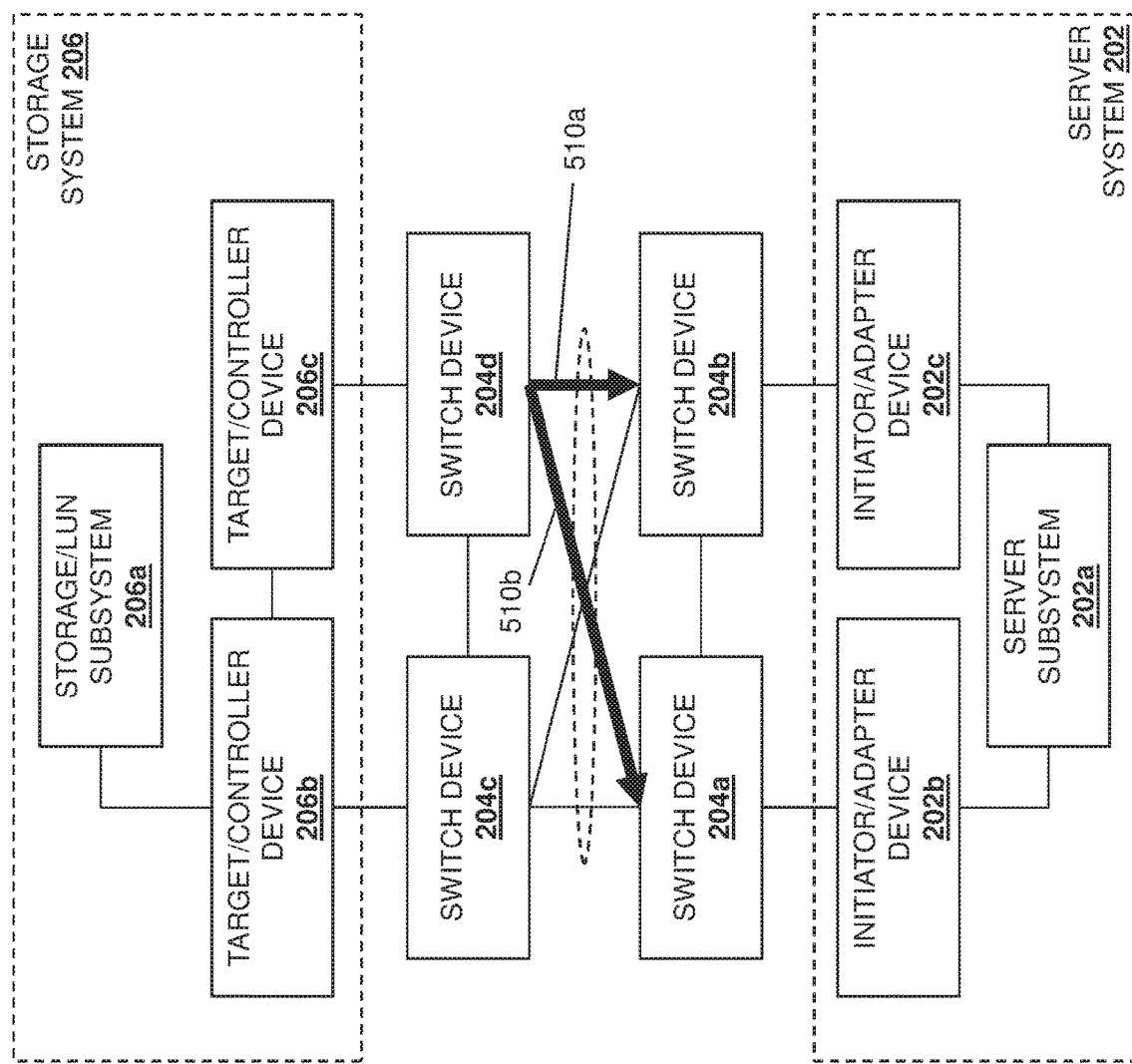
FIG. 5F is a schematic view illustrating an embodiment of the ALUA/aggregated switch latency reduction system operating during the method of FIG. 4.

Similarly, the table above illustrates how session communications between the initiator/adapter device 202*c* and the target/controller device 206*c* that are handled by the switch device 204*d* may be associated with a session identifier ("session 2"), a MAC address of the initiator/adapter device 202*c*, an MAC address of the target/controller device 206*c*, an IP address of the initiator/adapter device 202*c*, and an IP address of the target/controller device 206*c*. Furthermore, the switch engine 304 in the switch device 204*d*/300 may determine the MAC address of the target/controller device 206*c* identified in the snooped session communications for "session 2" and, in response to that MAC address being associated with the target/controller device 206*c* that is directly connected to its orphan port (discussed above), may "learn" the target/controller device 206*c* (as indicated by the "target device 206*c*" indication in the "DEVICE LEARNT" column of the table for "session 2"). As such, at block 404, the switch engine 304 in the switch device 204*d*/300 identifies its directly connected target/controller device 206*c*. As illustrated in FIG. 5F, at block 404, the switch engine 304 in the switch device 204*d*/300 may then generate and transmit communications 510*a* and 510*b* that identify its directly connected target/controller device 206*c* to each of the switch devices 204*a* and 204*b*. For example, the communications 510*a* and 510*b* may be provided by Type-Length-Value (TLV) communications that include information (e.g., a MAC address) that identifies the target/controller device 206*c*, as well as any other information that would be apparent to one of skill in the art in possession of the present disclosure.

The method 400 then proceeds to block 408 where each of the plurality of first switch devices identifies a second switch device directly connected to a target/controller device that is in a session with its directly connected initiator/adapter device, and configures itself to forward subsequent packets directly to that second switch device. In an embodiment, at block 408, the switch engine 304 in the switch device 204*a*/300 may receive the communication 508*a* transmitted by the switch device 204*c* (illustrated in FIG. 5E) via a port in its communication system 308 that is connected to the link to the switch device 204*c*, and the communication 510*b* transmitted by the switch device 204*d* (illustrated in FIG. 5F) via a port in its communication system 308 that is connected to the link to the switch device 204*d*. With reference to the communication 508*a*, the switch engine 304 in the switch device 204*a*/300 may identify the target/controller device 206*b* that is directly connected to the switch device 204*c* (e.g., via a MAC address for the target/controller device 206*b* included in the communication 508*a*), and may reference its table A (above) and determine that the identified target/controller device 206*b* is part of a session ("session 1") in which the initiator/adapter device 202*b* has been learned by the switch device 204*a*. In response, the switch engine 304 in the switch device 204*a*/300 may operate to "pin" the port that received the communication 508*a* for packet forwarding (e.g., that port may be "pinned" for iSCSI traffic).

With reference to the communication 510*b*, the switch engine 304 in the switch device 204*a*/300 may identify the target/controller device 206*c* that is directly connected to the switch device 204*d* (e.g., via a MAC address for the target/controller device 206*c* included in the communication 510*b*), and may reference its table A (above) and determine that the identified target/controller device 206*c* is part of a session ("session 2") in which no devices have been learned by the switch device 204*a*. In response, the switch engine 304 in the switch device 204*a*/300 will not operate to "pin" the port that received the communication 510*b* for packet forwarding. As will be appreciated by one of skill in the art in possession of the present disclosure, the pinning of the port connected to the link to the switch device 204*c* that is directly connected to the target/controller device 206*b*, while not pinning the port connected to the link to the switch device 204*d* that is directly connected to the target/controller device 206*c*, will ensure the forwarding of packets by the switch device 204*a* to the switch device 204*c* and prevent the forwarding of packets by the switch device 204*a* to the switch device 204*d*. For example, such pinning operations may ensure that hashing operations performed by the switch device 204*a* on a packet received from the server system 202 will only provide for forwarding of that packet via the port (or ports) connected to the link (or links) to the switch device 204*c* that is directly connected to the target/controller device 206*c* that owns the storage/LUN subsystem 206*a*, and will not allow forwarding of that packet via the port (or ports) connected to the link (or links) to the switch device 204*d* that is directly connected to the target/controller device 206*c* that does not own the storage/LUN subsystem 206*a*.

Similarly, in an embodiment of block 406, the switch engine 304 in the switch device 204*b*/300 may receive the communication 508*b* transmitted by the switch device 204*c* (illustrated in FIG. 5E) via a port in its communication system 308 that is connected to the link to the switch device 204*c*, and the communication 510*a* transmitted by the switch device 204*d* (illustrated in FIG. 5F) via a port in its communication system 308 that is connected to the link to the switch device 204*d*. With reference to the communication 508*b*, the switch engine 304 in the switch device 204*b*/300 may identify the target/controller device 206*b* that is directly connected to the switch device 204*c* (e.g., via a MAC address for the target/controller device 206*b* included in the communication 508*a*), and may reference its table B (above) and determine that the identified target/controller device 206*b* is part of a session ("session 1") in which no devices have been learned by the switch device 204*b*. In response, the switch engine 304 in the switch device 204*b*/300 will not operate to "pin" the port that received the communication 508*b* for packet forwarding.

With reference to the communication 510*a*, the switch engine 304 in the switch device 204*b*/300 may identify the target/controller device 206*c* that is directly connected to the switch device 204*d* (e.g., via a MAC address for the target/controller device 206*c* included in the communication 510*a*), and may reference its table B (above) and determine that the identified target/controller device 206*c* is part of a session ("session 2") in which the initiator/adapter device 202*c* has been learned by the switch device 204*b*. In response, the switch engine 304 in the switch device 204*b*/300 may operate to "pin" the port that received the communication 510a for packet forwarding (e.g., that port may be "pinned" for iSCSI traffic). As will be appreciated by one of skill in the art in possession of the present disclosure, the pinning of the port connected to the link to the switch device 204d that is directly connected to the target/controller device 206c, while not pinning the port connected to the link to the switch device 204c that is directly connected to the target/controller device 206b, will ensure the forwarding of packets by the switch device 204b to the switch device 204d and prevent the forwarding of packets by the switch device 204b to the switch device 204c. For example, such pinning operations may ensure that hashing operations performed by the switch device 204b on a packet received from the server system 202 will only provide for forwarding of that packet via the port (or ports) connected to the link (or links) to the switch device 204d, and will not allow forwarding of that packet via the port (or ports) connected to the link (or links) to the switch device 204c that is directly connected to the target/controller device 206b.

The method 400 then proceeds to block 410 where each of the plurality of second switch devices identifies a first switch device directly connected to an initiator/adapter device that is in a session with its directly connected target/controller device and configures itself to forward subsequent packets directly to that first switch device. In an embodiment, at block 410, the switch engine 304 in the switch device 204c/300 may receive the communication 504a transmitted by the switch device 204a (illustrated in FIG. 5C) via a port in its communication system 308 that is connected to the link to the switch device 204a, and the communication 506b transmitted by the switch device 204b (illustrated in FIG. 5D) via a port in its communication system 308 that is connected to the link to the switch device 204b. With reference to the communication 504a, the switch engine 304 in the switch device 204c/300 may identify the initiator/adapter device 202b that is directly connected to the switch device 204a (e.g., via a MAC address for the initiator/adapter device 202b included in the communication 504a), and may reference its table C (above) and determine that the identified initiator/adapter device 202b is part of a session ("session 1") in which the target/controller device 206b has been learned by the switch device 204c. In response, the switch engine 304 in the switch device 204c/300 may operate to "pin" the port that received the communication 504a for packet forwarding (e.g., that port may be "pinned" for iSCSI traffic).

With reference to the communication 506b, the switch engine 304 in the switch device 204c/300 may identify the initiator/adapter device 202c that is directly connected to the switch device 204b (e.g., via a MAC address for the initiator/adapter device 202c included in the communication 506b), and may reference its table C (above) and determine that the identified initiator/adapter device 202c is part of a session ("session 2") in which no devices have been learned by the switch device 204c. In response, the switch engine 304 in the switch device 204c/300 will not operate to "pin" the port that received the communication 506b for packet forwarding. As will be appreciated by one of skill in the art in possession of the present disclosure, the pinning of the port connected to the link to the switch device 204a that is directly connected to the initiator/adapter device 202b, while not pinning the port connected to the link to the switch device 204b that is directly connected to the initiator/adapter device 202c, will ensure the forwarding of packets by the switch device 204c to the switch device 204a and prevent the forwarding of packets by the switch device 204c to the switch device 204b. For example, such pinning operations may ensure that hashing operations performed by the switch device 204c on a packet received from the storage system 206 will only provide for forwarding of that packet via the port (or ports) connected to the link (or links) to the switch device 204a, and will not allow forwarding of that packet via the port (or ports) connected to the link (or links) to the switch device 204b that is directly connected to the initiator/adapter device 202c.

Similarly, in an embodiment of block 410, the switch engine 304 in the switch device 204d/300 may receive the communication 504b transmitted by the switch device 204a (illustrated in FIG. 5C) via a port in its communication system 308 that is connected to the link to the switch device 204a, and the communication 506a transmitted by the switch device 204b (illustrated in FIG. 5D) via a port in its communication system 308 that is connected to the link to the switch device 204b. With reference to the communication 504b, the switch engine 304 in the switch device 204d/300 may identify the initiator/adapter device 202b that is directly connected to the switch device 204a (e.g., via a MAC address for the initiator/adapter device 202b included in the communication 504b), and may reference its table D (above) and determine that the identified initiator/adapter device 202b is part of a session ("session 1") in which no devices have been learned by the switch device 204d. In response, the switch engine 304 in the switch device 204d/300 will not operate to "pin" the port that received communication 504b for packet forwarding.

With reference to the communication 506a, the switch engine 304 in the switch device 204d/300 may identify the initiator/adapter device 202c that is directly connected to the switch device 204b (e.g., via a MAC address for the initiator/adapter device 202c included in the communication 506a), and may reference its table D (above) and determine that the identified initiator/adapter device 202c is part of a session ("session 2") in which the target/controller device 206c has been learned by the switch device 204d. In response, the switch engine 304 in the switch device 204d/300 may operate to "pin" the port that received the communication 506a for packet forwarding (e.g., that port may be "pinned" for iSCSI traffic). As will be appreciated by one of skill in the art in possession of the present disclosure, the pinning of the port connected to the link to the switch device 204b that is directly connected to the initiator/adapter device 202c, while not pinning the port connected to the link to the switch device 204a that is directly connected to the initiator/adapter device 202b, will ensure the forwarding of packets by the switch device 204d to the switch device 204b and prevent the forwarding of packets by the switch device 204d to the switch device 204a. For example, such pinning operations may ensure that hashing operations performed by the switch device 204d on a packet received from the storage system 206 will only provide for forwarding of that packet via the port (or ports) connected to the link (or links) to the switch device 204b, and will not allow forwarding of that packet via the port (or ports) connected to the link (or links) to the switch device 204a that is directly connected to the initiator/adapter device 202b.

As will be appreciated by one of skill in the art in possession of the present disclosure, the port pinning operations of the present disclosure operate to eliminate situations like that described above in which the switch device 204a may perform hashing operations on a packet received from the server system 202 that result in the forwarding of that packet to the switch device 204d (which is directly connected to the target/controller device 206c that does not own the storage/LUN subsystem 206a), which then requires that switch device 204d forward that packet to the switch device 204c (which is directly connected to the target/controller device 206b that owns the storage/LUN subsystem 206b) via a switch device interconnect between them, re-introducing the packet transmission latency that the ALUA deployment is attempting to eliminate. Instead, the pinning operations described above will ensure that hashing operations performed by the switch device 204a on a packet received from the server system 202 will only provide for forwarding of that packet via the port (or ports) connected to the link (or links) to the switch device 204c that is directly connected to the target/controller device 206c that owns the storage/LUN subsystem 206a, as the port (or ports) connected to the link (or links) to the switch device 204d that is directly connected to the target/controller device 206c that does not own the storage/LUN subsystem 206a will not be an available option via those hashing operations, thus reducing packet transmission latency that can occur in conventional systems.

However, in some embodiments, the switch device 204c may become unavailable for forwarding packets by the switch device 204a. As such, in some examples, when receiving packets from the server system 202, the switch engine 304 in the switch device 204a/300 may determine whether the switch device 204c is available. In response to determining the switch device 204c is available, the switch engine 304 in the switch device 204a/300 may then operate as described above to forward those packets to the switch device 204c. However, in response to determining the switch device 204c is unavailable, the switch engine 304 in the switch device 204a/300 may forward the packets using the switch device 204d that is directly connected to target/controller device 206c that does not own the storage/LUN subsystem 206a, and log a warning about the forwarding of the packets using the switch device 204d that is directly connected to target/controller device 206c that does not own the storage/LUN subsystem 206a.

Thus, systems and methods have been described that provide, in ALUA deployments including VLT switch systems that couple initiator devices to target devices, first VLT switch devices in the VLT switch system that identify their directly connected initiator devices, and second VLT switch devices in the VLT switch system that identify their directly connected target devices. Each first VLT switch device then transmits respective first TLVs to each of the second VLT switch devices that identify their directly connected initiator device, and each second VLT switch device transmits respective second TLVs to each of the first VLT switch devices that identify their directly connected target device. Each first VLT switch device may then identify one of the second VLT switch devices that is directly connected to a target device that is in a session with its directly connected initiator device, and then cause subsequent packets to be forwarded to that second VLT switch device. Similarly, each second VLT switch device may identify one of the first VLT switch devices that is directly connected to an initiator device that is in a session with its directly connected target device, and then cause subsequent packets to be forwarded to that first VLT switch device. As such, when packets are received from an initiator device by a first VLT switch device coupled to a second VLT switch device that is directly connected to the target device that owns the storage LUN, that first VLT switch device will forward those packets to that second VLT switch device rather than another second VLT switch device that is directly connected to a target device that does not own the storage LUN, which eliminates an additional hop for the packets between second VLT switch devices (e.g., one that is directly connected to the target device that does not own the storage LUN and one that is directly connected to the target device that owns the storage LUN.) As such, packet transmission latency in AULA/VLT switch systems is reduced.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An Asymmetrical Logical Unit Access (ALUA)/aggregated switch latency reduction system, comprising:
   a server system including a plurality of initiator devices;
   a storage system including a storage subsystem coupled to a plurality of target devices; and
   a switch aggregation system that couples the server system to the storage system, wherein the switch aggregation system includes:
      a plurality of first switch devices that are each directly coupled to a respective target device included in the plurality of target devices; and
      a plurality of second switch devices that are each directly coupled to a respective initiator device included in the plurality of initiator devices,
         wherein the plurality of first switch devices and the plurality of second switch devices are aggregated in a link aggregation group that is configured to perform load-balancing operations on packets forwarded via the link aggregation group, and
         wherein each second switch device included in the plurality of second switch devices is configured to:
            identify the respective initiator device that is directly connected to that second switch device;
            transmit, to each of the plurality of first switch devices, a respective first communication that identifies the respective initiator device that is directly connected to that second switch device;
            receive, from each of the plurality of first switch devices, a respective second communication that identifies the respective target device that is directly connected to that first switch device;
            identify, from the respective second communications, one of the plurality of first switch devices that is directly connected to one of the plurality of target devices that is in a session with the one of the plurality of initiator devices that is directly connected to that second switch device;
            pin, to the one of the plurality of first switch devices that is directly connected to one of the plurality of target devices that is in the session with the one of the plurality of initiator devices that is directly connected to that second switch device and in response to that one of the plurality of first switch devices being directly connected to the one of the plurality of target devices in the session with the one of the plurality of initiator devices that is directly connected to that second switch device, a second switch device port on that second switch device to that one of the plurality of first switch devices;
            forward, as part of the load balancing operations performed by the link aggregation group and based on the pinning of the second switch device port on that second switch device, packets to the one of the plurality of first switch devices to which the second switch device port is pinned; and prevent, via the load balancing operations performed by the link aggregation group and based on the pinning of the second switch device port on that second switch device, packets from being forwarded to an other of the plurality of first switch devices that is directly connected to an other of the plurality of target devices that is not in the session with the one of the plurality of initiator devices that is directly connected to that second switch device.

2. The system of claim 1, wherein each first switch device included in the plurality of first switch devices is configured to:
identify the respective target device that is included in the plurality of target devices and that is directly connected to that first switch device;
transmit, to each of the plurality of second switch devices, the respective second communication that identifies the respective target device that is directly connected to that first switch device;
receive, from each of the plurality of second switch devices, the respective first communication that identifies the respective initiator device that is directly connected to that second switch device; and
identify, from the respective first communications, one of the plurality of second switch devices that is directly connected to one of the plurality of initiator devices that is in a session with the one of the plurality of target devices that is directly connected to that first switch device and, in response, cause packets to be forwarded to that one of the plurality of second switch devices.

3. The system of claim 1, wherein each second switch device included in the plurality of second switch devices is configured to:
snoop communications transmitted by the one of the plurality of target devices that is in the session with the one of the plurality of initiator devices that is directly connected to that second switch device; and
determine that the one of the plurality of target devices supports Asymmetrical Logical Unit Access (ALUA) operations.

4. The system of claim 1, wherein each second switch device included in the plurality of second switch devices is configured to:
snoop session communications transmitted by the one of the plurality of initiator devices that is directly connected to that second switch device;
identify, in the snooped session communications, a first Media Access Control (MAC) address for the one of the plurality of initiator devices that is directly connected to that second switch device; and
use the first MAC address to identify that the one of the plurality of initiator devices is directly connected to that second switch device.

5. The system of claim 4, wherein each second switch device included in the plurality of second switch devices is configured to:
identify, in the snooped session communications, a second Media Access Control (MAC) address for the one of the plurality of target devices that is in the session with the one of the plurality of initiator devices that is directly connected to that second switch device;

identify, in one of the second communications, the second Media Access Control (MAC) address for the one of the plurality of target devices that is in the session with the one of the plurality of initiator devices that is directly connected to that second switch device and, in response, cause the packets to be forwarded to the one of the plurality of first switch devices that is directly connected to that one of the plurality of target devices.

6. The system of claim 1, wherein the first communications are first Type-Length-Value (TLV) communications, and the second communications are second TLV communications.

7. An Information Handling System (IHS), comprising:
a processing system; and
a memory system that is coupled to the processing system and that includes instructions that, when executed by the processing system, cause the processing system to provide a switch engine that is configured to:
identify an initiator device that is directly connected to the Information Handling System (IHS);
transmit, to each of a plurality of switch devices that are aggregated with the IHS in a link aggregation group that is configured to perform load-balancing operations on packets forwarded via the link aggregation group, a respective first communication that identifies the initiator device that is directly connected to the IHS;
receive, from each of the plurality of switch devices, a respective second communication that identifies one of a plurality of target devices that is directly connected to that switch device;
identify, from the respective second communications, one of the plurality of switch devices that is directly connected to the one of the plurality of target devices that is in a session with the initiator device that is directly connected to the IHS;
pin, to the one of the plurality of switch devices that is directly connected to one of the plurality of target devices that is in the session with the initiator device that is directly connected to the IHS and in response to that one of the plurality of switch devices being directly connected to the one of the plurality of target devices in the session with the initiator device that is directly connected to the IHS, a port on the IHS to that one of the plurality of switch devices;
forward, via the load balancing operations performed by the link aggregation group and based on the pinning of the port on the IHS, packets to the one of the plurality of switch devices to which the port on the IHS is pinned; and
prevent, via the load balancing operations performed by the link aggregation group and based on the pinning of the port on the IHS, packets from being forwarded to an other of the plurality of switch devices that is directly connected to an other of the plurality of target devices that is not in the session with the initiator device that is directly connected to the IHS.

8. The IHS of claim 7, wherein the switch engine is configured to:
snoop communications transmitted by the one of the plurality of target devices that is in the session with the initiator device that is directly connected to the IHS; and
determine that one of the plurality of target devices supports Asymmetrical Logical Unit Access (ALUA) operations.

9. The IHS of claim 7, wherein the switch engine is configured to:
  snoop session communications transmitted by the initiator device that is directly connected to the IHS;
  identify, in the snooped session communications, a first Media Access Control (MAC) address for the initiator device that is directly connected to the IHS; and
  use the first MAC address to identify that the initiator device is directly connected to the IHS.

10. The IHS of claim 9, wherein the switch engine is configured to:
  identify, in the snooped session communications, a second Media Access Control (MAC) address for the one of the plurality of target devices that is in the session with the initiator device that is directly connected to the IHS;
  identify, in one of the respective second communications, the second Media Access Control (MAC) address for the one of the plurality of target devices that is in the session with the initiator device that is directly connected to the IHS and, in response, cause the first packets to be forwarded to the one of the plurality of switch devices that is directly connected to that one of the plurality of target devices.

11. The IHS of claim 7, wherein the switch engine is configured to:
  receive, from the server system, the first packets;
  determine that the one of the plurality of switch devices, which is directly connected to the one of the plurality of target devices that is in the session with the initiator device that is directly connected to the IHS, is available; and
  cause, in response to that one of the plurality of switch devices being available, the first packets to be forwarded to that one of the plurality of switch devices.

12. The IHS of claim 7, wherein the switch engine is configured to:
  receive, from the server system, second packets;
  determine that the one of the plurality of switch devices, which is directly connected to the one of the plurality of target devices that is in the session with the initiator device that is directly connected to the IHS, is not available; and
  cause, in response to that one of the plurality of switch devices not being available, a warning to be logged about the forwarding of the second packets using one of the plurality of switch devices that is directly connected to one of the plurality of target devices that is not in the session with the initiator device that is directly connected to the IHS.

13. The IHS of claim 7, wherein the first communications are first Type-Length-Value (TLV) communications, and the second communications are second TLV communications.

14. A method for reducing latency in a switch aggregation that is part of an Asymmetrical Logical Unit Access (ALUA) deployment, comprising:
  identifying, by a first switch device, an initiator device that is directly connected to the first switch device;
  transmitting, by the first switch device to each of a plurality of second switch devices that are aggregated with the first switch device in a link aggregation group that is configured to perform load-balancing operations on packets forwarded via the link aggregation group, a respective first communication that identifies the initiator device that is directly connected to the first switch device;
  receiving, by the first switch device from each of the plurality of second switch devices, a respective second communication that identifies one of a plurality of target devices that is directly connected to that second switch device;
  identifying, by the first switch device from the respective second communications, one of the plurality of second switch devices that is directly connected to the one of the plurality of target devices that is in a session with the initiator device that is directly connected to the first switch device;
  pinning, by the first switch device to the one of the plurality of second switch devices that is directly connected to one of the plurality of target devices that is in the session with the initiator device that is directly connected to the first switch device and in response to that one of the plurality of second switch devices being directly connected to the one of the plurality of target devices in the session with the initiator device that is directly connected to the first switch device, a port on the first switch device to that one of the plurality of second switch devices;
  forwarding, by the first switch device via the load balancing operations performed by the link aggregation group and based on the pinning of the port on the first switch device, packets to the one of the plurality of second switch devices to which the port on the first switch device is pinned; and
  preventing, by the first switch device via the load balancing operations performed by the link aggregation group and based on the pinning of the port on the first switch device, packets from being forwarded to an other of the plurality of second switch devices that is directly connected to an other of the plurality of target devices that is not in the session with the initiator device that is directly connected to the first switch device.

15. The method of claim 14, further comprising:
  snooping, by the first switch device, communications transmitted by the one of the plurality of target devices that is in the session with the initiator device that is directly connected to the first switch device; and
  determining, by the first switch device, that one of the plurality of target devices supports Asymmetrical Logical Unit Access (ALUA) operations.

16. The method of claim 14, further comprising:
  snooping, by the first switch device, session communications transmitted by the initiator device that is directly connected to the first switch device;
  identifying, by the first switch device in the snooped session communications, a first Media Access Control (MAC) address for the initiator device that is directly connected to the first switch device; and
  using, by the first switch device, the first MAC address to identify that the initiator device is directly connected to the first switch.

17. The method of claim 16, further comprising:
  identifying, by the first switch device in the snooped session communications, a second Media Access Control (MAC) address for the one of the plurality of target devices that is in the session with the initiator device that is directly connected to the first switch device;
  identifying, by the first switch device in one of the respective second communications, the second Media Access Control (MAC) address for the one of the plurality of target devices that is in the session with the initiator device that is directly connected to the first switch device and, in response, cause the first packets to be forwarded to the one of the plurality of second switch devices that is directed connected to that one of the plurality of target devices.

18. The method of claim 14, further comprising:

receiving, by the first switch device from the server system, the first packets;

determining, by the first switch device, that the one of the plurality of second switch devices, which is directly connected to the one of the plurality of target devices that is in the session with the initiator device that is directly connected to the first switch device, is available; and causing, by the first switch device in response to that one of the plurality of second switch devices being available, the first packets to be forwarded to that one of the plurality of second switch devices.

19. The method of claim 14, further comprising:

receiving, by the first switch device from the server system, second packets;

determining, by the first switch device, that the one of the plurality of second switch devices, which is directly connected to the one of the plurality of target devices that is in the session with the initiator device that is directly connected to the IHS, is not available; and causing, in response to that one of the plurality of second switch devices not being available, a warning to be logged about the forwarding of the second packets using one of the plurality of second switch devices that is directly connected to one of the plurality of target devices that is not in the session with the initiator device that is directly connected to the first switch device.

20. The method of claim 14, wherein the first communications are first Type-Length-Value (TLV) communications, and the second communications are second TLV communications.

* * * * *

UNITED STATES PATENT AND TRADEMARK OFFICE
CERTIFICATE OF CORRECTION

PATENT NO. : 11,281,600 B2
APPLICATION NO. : 16/439515
DATED : March 22, 2022
INVENTOR(S) : Subbiah et al.

It is certified that error appears in the above-identified patent and that said Letters Patent is hereby corrected as shown below:

In the Claims

Claim 17, Column 25, Line 1, "directed connected" should be changed to --directly connected--.

Signed and Sealed this
Thirty-first Day of May, 2022

*Katherine Kelly Vidal*

Katherine Kelly Vidal
*Director of the United States Patent and Trademark Office*